(12) United States Patent
Marx et al.

(10) Patent No.: US 7,945,425 B2
(45) Date of Patent: May 17, 2011

(54) IN-FLIGHT DETECTION OF WING FLAP FREE WHEELING SKEW

(75) Inventors: Alan D. Marx, Shoreline, WA (US); Gary A. Emch, Arlington, WA (US); Mark J. Gardner, Snohomish, WA (US); Richard I. Apfel, Seattle, WA (US); Michael E. Renzelmann, Woodinville, WA (US); Christopher D. Feet, Marysville, WA (US); Michael R. Finn, Kirkland, WA (US); Mark S. Good, Seattle, WA (US); Gregory J. Seehusen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 413 days.

(21) Appl. No.: 12/253,747

(22) Filed: Oct. 17, 2008

(65) Prior Publication Data

US 2010/0100355 A1    Apr. 22, 2010

(51) Int. Cl.
*G06F 11/30* (2006.01)
(52) U.S. Cl. .................................. 702/183; 244/213
(58) Field of Classification Search .......... 702/182–185, 702/188; 244/213
See application file for complete search history.

(56) References Cited

U.S. PATENT DOCUMENTS

| 5,680,124 | A | 10/1997 | Bedell et al. |
| 5,686,907 | A | 11/1997 | Bedell et al. |
| 6,299,108 | B1 | 10/2001 | Lindstrom et al. |
| 6,382,566 | B1 | 5/2002 | Ferrel et al. |
| 6,466,141 | B1 | 10/2002 | McKay et al. |
| 6,483,436 | B1 | 11/2002 | Emaci et al. |
| 6,824,099 | B1 * | 11/2004 | Jones ........................ 244/99.12 |
| 6,930,489 | B2 | 8/2005 | Schievelbusch et al. |
| 7,338,018 | B2 | 3/2008 | Huynh et al. |
| 7,354,022 | B2 * | 4/2008 | Richter et al. ................ 244/194 |
| 2002/1017155 | | 11/2002 | Emaci et al. |
| 2009/0272843 | A1 * | 11/2009 | Schlipf ....................... 244/99.3 |

* cited by examiner

*Primary Examiner* — Edward Raymond
(74) *Attorney, Agent, or Firm* — Haynes & Boone, LLP.

(57) ABSTRACT

A method for detecting freewheeling skew failures in the wing flaps of an aircraft includes measuring the outputs of flap skew sensors when the aircraft is in flight (IF) and the flaps are extended to a selected position, and when the aircraft is next on the ground (OG) and the flaps are extended to the selected position. The respective differences between the IF and OG outputs of symmetrical pairs of the flap skew sensors are computed, and then the respective difference between the computed IF output difference and the computed OG output difference of each symmetrical pair of the sensors is computed. The computed IF and OG difference of each symmetrical pair of the sensors is then compared with each of predetermined maximum and minimum threshold value to determine whether a freewheeling skew failure exists in any of the flaps of the aircraft.

20 Claims, 3 Drawing Sheets

IN-FLIGHT DETECTION OF WING FLAP FREE WHEELING SKEW

BACKGROUND

1. Technical Field

This disclosure relates to aircraft flight sensors in general, and in particular, to a system for the in-flight detection of small wing flap deflections that are indicative of failures of the flap structure or flap drive mechanism using existing flap sensors that have measurement errors on the same order of magnitude of the small deflections being detected.

2. Related Art

Flaps are airfoil surfaces moveably coupled to the trailing edge (TE) of the wings of a fixed-wing aircraft by means of powered hinging/lowering drive mechanisms typically located at the opposite ends of each flap. As the flaps are lowered and/or extended relative to the wing during landing, lift and drag are increased to permit slower approach speeds and greater maneuverability. Other types of flaps, referred to as "slats" or "Krueger flaps," may also be used on the leading edge of the wings of some high-speed jet aircraft.

Certain failures of the structural members or drives of TE flaps of some types of modern aircraft can result in a condition referred to as "freewheeling skew" in which one side of the flap becomes disconnected from the associated flap drive mechanism, thereby allowing the flap to move freely about the hinge point of the flap. Due to the stiffness of the flaps, this creates only small deflections when aerodynamic loads are applied to the flap during flight. However, if this type of failure goes undetected, the flap can become completely disconnected from the aircraft, resulting in a more serious failure. Additionally, this type of failure is usually not obvious when the aircraft is at rest or taxiing on the ground because the disconnected side of the flap will not droop conspicuously, due to the stiffness of the flap and the configuration of the flap-to-aircraft connection structure. Methods and apparatus are therefore needed to detect this type of failure reliably and without adding significant weight or cost to the aircraft.

The problem becomes one of detecting small flap deflections with a light weight system that uses existing, low-accuracy flap sensors that have measurement errors of the same order of magnitude as the small deflections being measured to detect freewheeling skew. Existing solutions include the provision of additional structure, i.e., redundant or multiple load paths, between the flap and the wing. These solutions function by preventing the flap from becoming disconnected from the aircraft, and hence, are relatively heavy and require costly periodic inspections to detect failures. Hence, the multiple load path solution is acceptable only if no other solutions exist, because it adds substantial weight, cost and complexity to the aircraft.

Additionally, for certain other types of flap configurations, a flap skew failure is readily obvious, even when the aircraft is situated on the ground, because the disconnected side of the flap will droop conspicuously, and hence, can be readily detected on a typical pre-flight "walk-around" of an aircraft having this type of flap configuration. However, visual detection during a walk-around is only applicable to certain aircraft having a different type of flap configuration than the ones contemplated herein.

Accordingly, what is needed are systems that are capable of detecting wing flap freewheeling skew failures reliably, inexpensively and without adding significant weight or cost to the aircraft.

SUMMARY

In accordance with the present disclosure, methods and apparatus are provided for detecting small wing flap deflections caused by aerodynamic loads acting on the flap during flight using existing flap sensors that can have measurement errors of the same magnitude as the small deflections being detected. The system accurately and reliably detects small flap surface deflections during flight that are indicative of flap freewheeling skew, i.e., disconnect failures, of the flap structure or drive system.

In one example embodiment, a method for detecting freewheeling skew failures in an aircraft having trailing edge (TE) flaps and associated flap drive mechanisms located symmetrically with respect to a sagittal plane of the aircraft comprises measuring the outputs of flap skew sensors of each flap drive mechanism of each flap of the aircraft when the aircraft is in flight (IF) and the flaps are extended to a selected position, and when the aircraft is next disposed on the ground (OG) and the flaps are extended to the selected position. The respective differences between the IF and OG outputs of symmetrical pairs of the flap skew sensors are computed, and then the respective differences between the computed IF output difference and the computed OG output difference of each symmetrical pair of the sensors are computed. The computed IF and OG difference of each symmetrical pair of the sensors is then compared with predetermined maximum and minimum threshold values to determine whether a freewheeling flap skew failure exists on any of the flaps on the aircraft.

The detection system uses existing, low-accuracy flap sensors to accurately and reliably detect small flap surface deflections during flight that are indicative of flap freewheeling skew. This eliminates the weight and cost of additional sensors, their installation costs and the additional wiring and interfaces attendant thereto, and further, avoids any drive system reliability issues associated with adding additional sensors.

A better understanding of the above and many other features and advantages of the wing flap free wheeling skew detection system of the present invention may be obtained from a consideration of the detailed description of some example embodiments thereof below, particularly if such consideration is made in conjunction with the appended drawings, wherein like reference numerals are used to identify like elements illustrated in one or more of the figures thereof.

DETAILED DESCRIPTION

Figure 1:
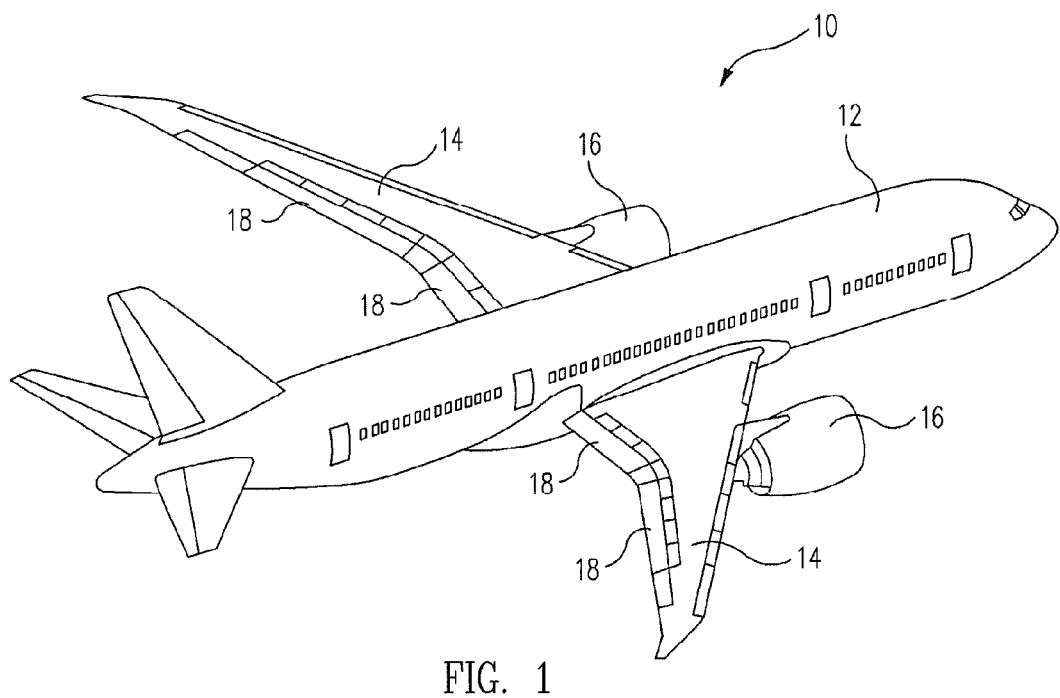
FIG. 1 is an upper right side perspective view of an aircraft incorporating flaps on the trailing edges of its wings of a type to which the flap skew detection system and methods of the present disclosure are applicable.
Figure 2:
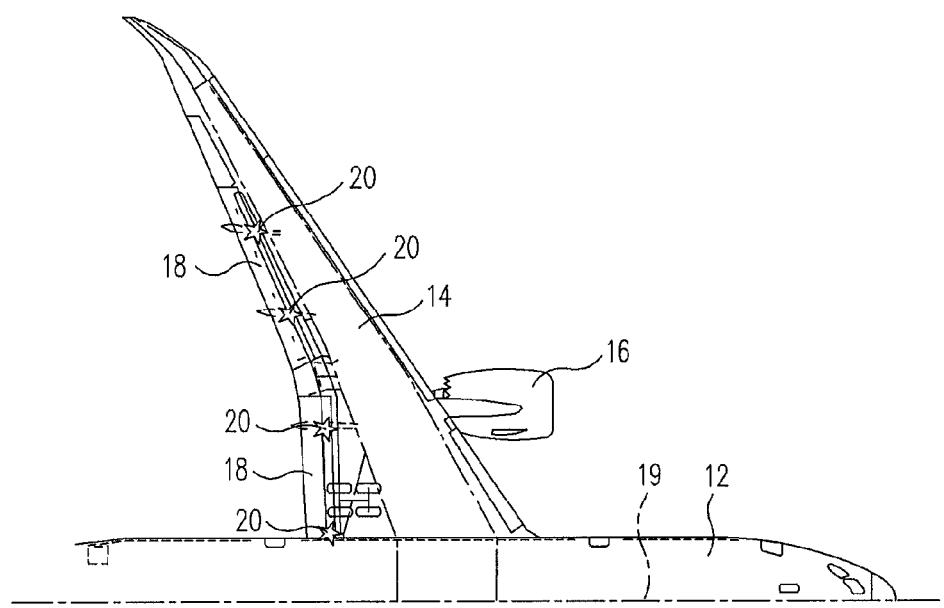
FIG. 2 is a partial top plan view of the aircraft of FIG. 1, showing the locations of the respective TE flap drive mechanisms of the aircraft.

FIGS. 1 and 2 are perspective and partial top plan views of a modern jet aircraft 10 of a type to which the freewheeling skew detection system and methods of the present disclosure have advantageous application. With reference to FIGS. 1 and 2, the aircraft comprises an elongated fuselage 12 having a pair of sweptback wings 14 respectively disposed on opposite sides thereof that are adapted to generate lift as the aircraft moves through the air. Each wing includes a jet engine 16 supported on a pylon below the wing and a pair of flaps 18 supported at the trailing edge (TE) thereof by a pair of flap drive mechanisms 20 for extension, i.e., pivotal and translational movement relative to the TE of the wing. As illustrated in FIGS. 1 and 2, the flaps are disposed symmetrically with respect to the sagittal plane 19 of the aircraft and, in operation, are extended and retracted simultaneously with each other.

Figure 3:
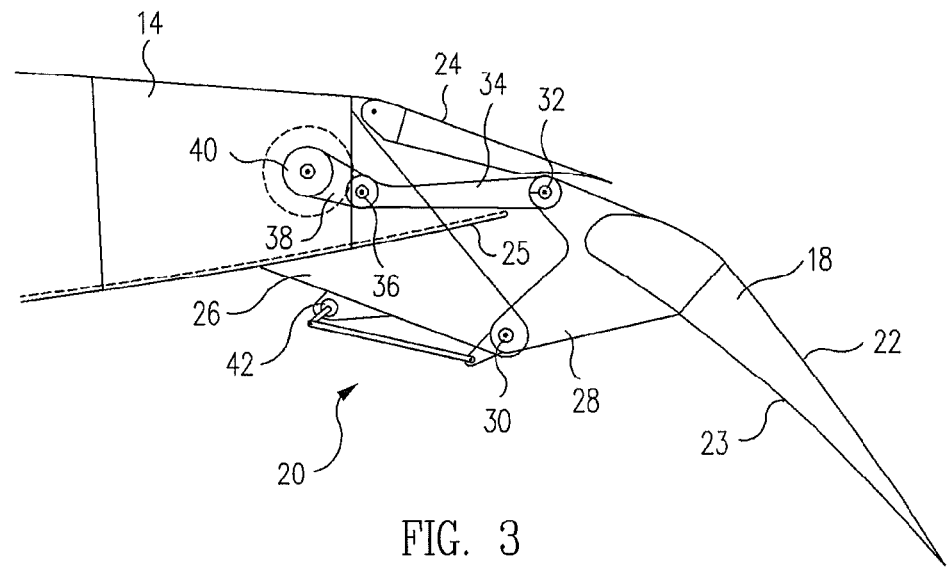
FIG. 3 is a partial cross-sectional view of the trailing edge of a wing of the aircraft of FIGS. 1 and 2, showing an example embodiment of a flap and drive mechanism thereof.

FIG. 3 is a partial cross-sectional view of one of the TE flaps 18 of the aircraft 10, showing one of the flap connecting-and-actuating mechanisms 20 thereof, referred to herein as a "flap drives." As illustrated in FIG. 3, the example flap incorporates an airfoil cross-sectional shape and includes upper and lower surfaces 22 and 23 that fair smoothly into respective ones of the upper and lower surfaces 24 and 25 of the wing 14 when the flap is disposed in a fully retracted position (not illustrated), and that are displaced rearwardly and downwardly from the wing when disposed in an extended or deployed position, as illustrated in FIG. 3. When the TE flaps 18 are extended relative to the wing during flight, e.g., during a landing, the effective airfoil shape of the wing is altered, thereby increasing lift. During high-speed flight, the flaps are retracted back toward the wing so as to blend smoothly into the TE of the wing and thereby reduce drag.

In the particular example flap 18 embodiment of FIG. 3, the flap drive 20 includes a first arm 26 rigidly fixed to the TE of the wing 14 and a second, V-shaped arm 28 rigidly fixed to the flap. A lower end 30 of the second arm 28 is pivotally supported by the first arm 26 and an upper end 32 of the second arm is rotatably coupled to a first end of a linkage arm 34. A second end 36 of the linkage arm 34 is rotatably coupled to a driving arm 38 that is fixed to a torque tube 40, which extends generally parallel to the TE of the wing 14, and which may be selectively rotated in a clockwise or counterclockwise direction by means of hydraulic, pneumatic, or electrical flap actuators (not illustrated). Thus, rotation of the torque tube 40 in a clockwise direction is coupled through the linkages of the mechanism to the flap 18, causing it to retract toward the wing 14, and counterclockwise rotation of the torque tube causes the flap to extend relative to the wing.

Each of the flap drives 20 additionally comprises a sensor 42 and associated actuation linkage. These sensors typically comprise Rotary Variable Differential Transformer (RVDT) sensors, and are installed at each drive 20 station (typically two) of each flap 18. The sensors are driven by the mechanical linkage of the associated flap drive mechanism 20, which causes the sensor to rotate as the flaps are moved in or out, giving a gross measurement of the movement of one side of the flap at which they are located. These sensors are typically used to detect a "powered skew," i.e., a condition that occurs when one side of the flap cannot move relative to the other side of the flap during flap deployment. However, the RVDT sensors 42 are relatively inaccurate, and by themselves, are not capable of measuring small wing flap deflections that are indicative of freewheeling flap skew failures with sufficient accuracy.

As those of skill in the art will appreciate, the details of the flap drives 20 and skew sensors 42 thereof can vary considerably from the particular embodiment illustrated in FIG. 3 and described above, depending on the particular type of aircraft involved. However, it should be understood that the detection system and methods of the present disclosure are applicable to a wide variety of aircraft types, regardless of the difference in such details.

Figure 4:
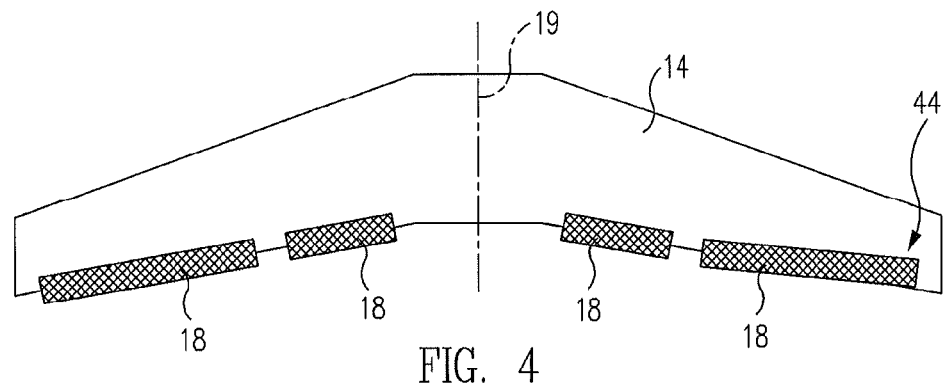
FIG. 4 is a partial schematic plan view of the wing of the aircraft, showing an exaggerated free wheeling skew failure condition in one of the flaps thereof.

As illustrated at the right outboard flap 18 of FIG. 4, certain failures of the drive mechanisms 20 of TE flaps of some types of aircraft 10 can result in a condition referred to as freewheeling skew 44, in which one side of the flap becomes partially disconnected from the associated flap drive mechanism 20, thereby allowing the flap to move freely about the hinge point of the flap. Due to the inherent stiffness of the flap, this may result in only small deflections when aerodynamic loads are applied to the flap during flight. However, if this type of failure 44 goes undetected, the flap can become completely disconnected from the aircraft, resulting in a more serious type of failure.

Moreover, this type of failure is usually not obvious when the aircraft 10 is at rest or taxiing on the ground because the disconnected side of the flap 18 will not droop conspicuously, due to the configuration of the flap-to-aircraft connection structure. As discussed above, the RVDT sensors 42, by themselves, lack the accuracy to measure the small flap deflections that are indicative of failures of the flap drive 20 because they have measurement errors that are on the same order of magnitude of the deflections being detected.

Figure 6:
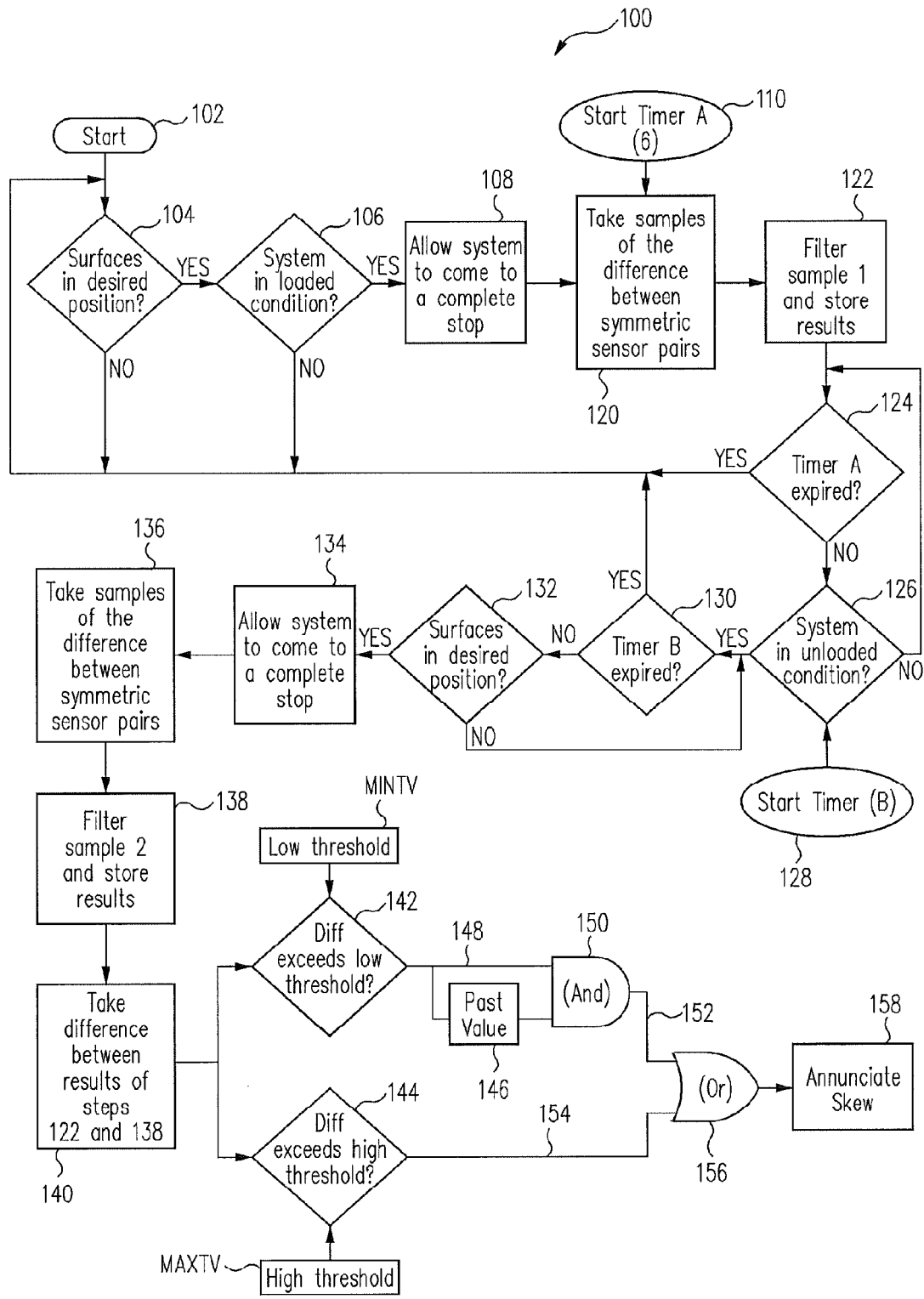

The flow and functional block diagram of FIG. 6 illustrates an example embodiment of a system 100 for reliably detecting the small surface deflections of a flap 18 during flight that are indicative of freewheeling skew 44 of the type illustrated in FIG. 4, i.e., failures of the flap drive 20. The freewheeling flap detection system 100 reliably detects drive-load-path-disconnect failures caused by a disconnected flap drive linkage or drive mechanism 20, or a failure downstream of a component in the actuator used to hold the flap in its commanded position, sometimes referred to as a "no-back brake" (not illustrated).

The novel detection system 100 uses the same, low-accuracy RVDT sensors 42 as used by the existing "powered skew detection" system of the aircraft 10 described above. However, it uses a substantially different detection method than that used by the existing system to achieve a substantially greater degree of precision. More specifically, the system 100 implements a method that uses two readings of aircraft flap 18 surface deflections taken fairly close together in time and at the same flap position of extension. The first reading is taken in the air just before the aircraft 10 lands, and the second reading is taken on the ground just after landing. The two sensor readings are then differenced, i.e., one is subtracted from the other. Because the errors due to time and temperature are the same for each of the two samples, taking the difference of the two readings cancels out the errors that would otherwise have to be accounted for. As discussed below, this procedure thereby provides a more accurate measurement of flap surface deflection, and enables the existing, low-accuracy sensors 42 of the flap drives 20 to be utilized to measure very small flap surface deflections accurately.

In particular, in the freewheeling flap skew detection system and method of FIG. 6, two separate sets of skew sensor readings are taken. The first set of readings is taken when the aircraft 10 is in the air and after the flaps 18 have been extended to a standard "detent 20" position on the flap control handle, i.e., to about 30 degrees of flap extension, during the aircraft's landing approach. As will be appreciated by those of skill in this art, the amount that a flap can be extended during flight is a function of the velocity of the aircraft—the lower the velocity of the aircraft, the greater is the amount that the flap can be extended safely, and, vice versa. This particular degree of flap extension and associated aircraft velocity, i.e., the "detent 20" position, is selected as the "in-flight" one of the two measuring points because, at this particular combination of flap extension and aircraft velocity, the aerodynamic force acting on the flap is at a maximum.

With reference to the upper portion of FIG. 6, the method of the system 100 starts (step 102) with a determination of whether the flaps 18 are 1) extended to the desired measurement position, i.e., to detent 20 (step 104) and in a loaded condition, i.e., that the aircraft is in flight (IF) (step 106), such that the aerodynamic forces acting on the flaps is at a maximum. The system 100 is then allowed to come to a steady state (step 108), such that the outputs of the sensors 42 are at a substantially steady state, i.e., are not changing. When the sensors of the system 100 have reached a steady state, a first timer A is started (step 110), and during the timed length of its operation, "snapshots," i.e., sample measurements of the difference between the outputs of symmetrical pairs of the RVDT sensors 42 of the flap drive mechanisms 20 are taken (step 120). The function of the timer A is to ensure that the airplane 10 lands within a specific amount of time from the time the first samples are taken. The sample differences are then filtered to remove noise and stored in a memory of the system (step 122).

Figure 5:
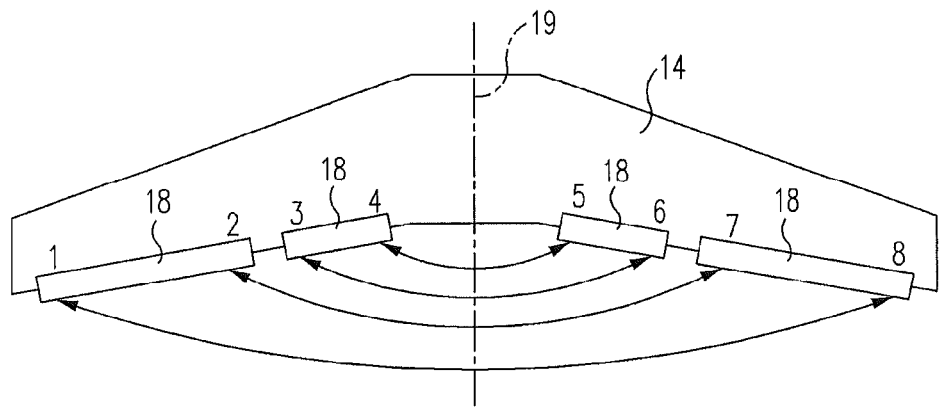
FIG. 5 is a partial schematic plan view of the example aircraft wing, indicating the locations of the respective flap drive mechanisms and flap sensors used in the detection of freewheeling skew; and, FIG. 6 is a flow and functional block diagram of an example embodiment of a novel system and method for the in-flight detection of small flap surface deflections that are indicative of freewheeling skew failures of the flap connection or drive structure in accordance with the present disclosure.

For each reading or "snapshot," the system 100 measures the IF output of each TE flap skew sensor 42 on the left wing 14 of the aircraft 10 and the IF output of the corresponding skew sensor on the right wing thereof, and then computes their difference. Thus, in the example embodiment illustrated in FIG. 5, in which each wing of the aircraft includes two flaps 18, each equipped with two (i.e., left and right) flap drives 20 and associated skew sensors 42, which are located symmetrically with respect to a sagittal plane 19 of the aircraft and at respectively numbered positions, e.g., 1 through 4 on the left side of the aircraft, and 5 through 8 on the right side thereof, then, Drive position #1 is compared to flap drive position #8 (most outboard sensor pair);

Drive position #2 is compared to flap drive position #7 (next inboard sensor pair);

Drive position #3 is compared to flap drive position #6 (next inboard sensor pair); and, Drive position #4 is compared to flap drive position #5 (most inboard sensor pair).

The number and location of the flaps 18 and associated drives 20 can vary, of course, depending on the particular type of aircraft involved, but it should be understood that the principles described herein are equally applicable to all configurations having symmetrically disposed flaps 18 and associated drives 20 and skew sensors 42.

The second set of sensor 42 readings is taken when the aircraft 10 is located on the ground (OG) and after the flaps 18 are retracted back to the "detent 20" position during aircraft rollout and/or taxi to the parking area. With reference to the middle portion of FIG. 6, the method of the system 100 continues with a determination of 1) whether the time allotted in the first timer A to complete the in-flight sensor samples has not expired (step 124), and 2) whether the system has changed to an unloaded-flaps condition, i.e., the aircraft 10 has landed (step 126). If so, a second timer B is started (step 128), and determinations are made of 1) whether the time set in the second timer B has not expired (step 130) and 2) whether the flaps 16 have been retracted back to the desired flap deflection measurement position, i.e., to the "detent 20" position (step 132). As before, the sensor outputs are allowed to come to a steady state condition (step 134) before the second or OG set of readings is made, and when the system has reached a steady state, and during the allotted time for measurement set in the second timer B, a second set of sample measurements and computations of the respective differences between outputs of symmetrical pairs of the RVDT sensors 42 of the flap drive mechanisms 20 are taken (step 136). The purpose of the Timer B is to ensure that a sample is taken within a given amount of time after the in-flight (IF) to on-ground (OG) transition. Thus, timers A and B both ensure that the IF and OG samples are taken within a relatively short amount of time of one another. As before, the OG difference samples are also filtered to remove noise and stored in a memory of the system (step 138).

The two sets of IF and OG sensor difference readings, or "snapshots," are then compared with each other by the detection system 100 in the following manner (step 140). The difference computed for each pair of corresponding flap connecting/actuating mechanism 20 positions is nominally zero if both flap connecting/actuating mechanisms 20 are intact. However, if a failure has occurred that allows a flap 18 to freewheel, the failed end of the flap will deflect under the aerodynamic load imposed on the flap when it is extended to the "detent 20" position during flight (IF), as discussed above. Hence, during flight, the difference between the sensor reading at the failed connecting/actuating mechanism station and the sensor reading at the corresponding intact drive station on the other wing will be non-zero. At the "detent 20" flap position on the ground after landing, however, the OG difference between the corresponding left and right wing flap skew sensors will always be zero. This is because 1) the flap 18 is relatively stiff, and hence, will be pulled into the correct position by the undamaged flap drive mechanism 20 on the other side of the flap, as discussed above, and 2) there are no aerodynamic forces acting on the flaps which would cause the flap at the failed drive station to deflect.

Thus, for each pair of corresponding flap skew sensors 42, the results of the two IF and OG snapshot measurements are "differenced," or subtracted from each other (step 140). Then, by comparing the difference between the two snapshots, each of which is itself the difference between the outputs of the two sensors at two different conditions, viz., during flight (IF) and on the ground (OG), sensor errors that are common to both IF and OG snapshots cancel out, thereby enabling the flap deflection under aerodynamic loads to be determined reliably and accurately.

With reference to the lower portion of FIG. 6, the method of the system 100 then continues as follows. For each flap drive and sensor station 1 through 8 of the example flap configuration of FIG. 5, the difference between the two IF and OG snapshots is compared to two different, predetermined "threshold values" that are stored in a memory of the system, viz., a minimum lower threshold value "MinTV" (step 142) and a maximum upper threshold value "MaxTV" (step 144) to provide a "digital" determination output, i.e., a "yes or no," "0 or 1" or a "high or low" output.

If the difference between the two IF and OG snapshots for any symmetrical pair of sensors 42 exceeds the lower threshold value MinTV (which does not vary with airspeed) for two consecutive flights, then the freewheeling flap skew detection system 100 is "tripped," i.e., the system issues a warning of a flap structural failure detection and the location of the drive 20 station at which the failure was detected. Thus, in the example system 100 of FIG. 6, the output 148 of the MinTV determination (step 142) of the immediately preceding operation, i.e., flight and landing, of the aircraft 10 is stored in a memory of the system and added logically with the corresponding MinTV determination output 146 of the current operation in an AND gate 150 of the system, and if both outputs 146 and 148 are ones, or "highs," the output of the AND gate 150 will also be a one or a "high" value, causing the system to be tripped and an alarm to be produced by a flap skew failure annunciator (step 158).

Alternatively, if the difference between the two snapshots exceeds the higher threshold, MaxTV (which does vary with airspeed), then the output 152 of the MaxTV determination (step 144) will be a one, or a "high," and the detection system 100 is programmed to trip immediately. This is effected in the logic circuitry of the example detection system 100 by combining the digital output 152 of the AND gate 150 with the output 154 of the MaxTV determination (step 144) in an OR gate 156.

Thus the freewheeling flap skew detection system 100 will be tripped if either 1) the MinTV is exceeded by a flap drive 20 for two consecutive flight operations of the aircraft 10, or, 2) the MaxTV is exceeded by a flap drive during the current flight operation. In either case, when the system trips, a fault is annunciated (step 158), and before the next flight of the aircraft is permitted, an inspection must be performed on the suspect flap drive mechanism 20 identified by the system as having failed.

As those of skill in the art will appreciate, the lower threshold value MinTV is used to reduce "nuisance" trips of the detection system 100. In this regard, it is statistically possible for the sensor 42 errors and system 100 tolerances to combine in such a way that it appears to the system that a free-wheeling skew has occurred. However, there is only a very low probability that this will occur in two immediately succeeding flight operations, i.e., takeoffs and landings. Therefore, the system 100 is configured as above such that the system will trip only if the lower threshold value MinTV is exceeded in two consecutive flight operations. On the other hand, if the higher threshold value MaxTV is reached in a single flight, there is a relatively high confidence that a free wheeling flap skew problem exists, and accordingly, the detection system 100 is configured to trip immediately.

The freewheeling skew detection system 100 is capable of detecting failures resulting in a freewheeling skew for flap deflections at a minimum airspeed of about 135 knots (minimum expected airspeed) with spoilers down. This is considered a worst-case scenario for detecting flap deflection because the aerodynamic loads on the flaps are relatively low. Aerodynamic flap loads increase with increasing airspeed and with the raising of spoilers, although the airspeed has a relatively greater affect.

As may be seen from the foregoing description, the detection system 100 uses the existing, relatively low-accuracy powered skew sensors 42 of an aircraft 10 to detect and annunciate a failure in the drive mechanisms 20 of the flaps 18. The system contemplates that an inspection will be required after the system "trips," i.e., when the monitored flap surface deflection exceeds predetermined minimum and maximum threshold values MinTV and MaxTV.

By comparison, the conventional "multiple load path" solution discussed above relies on additional flap support structure to mitigate, but not detect, the effect of failures, coupled with scheduled, long-interval inspections to actually detect a structural or drive failure. However, visual detection of a flap drooping due to a failure via a simple walk-around of the aircraft by maintenance personnel is not an option with many of the flap configurations used on modern, high speed passenger jet aircraft.

The system 100 of the present disclosure is relatively easy and inexpensive to implement in either existing aircraft or in new aircraft during construction because no additional sensors or wiring need to be added to the aircraft. This, in turn, eliminates the weight and cost of installation of the additional sensors, as well as those of the additional wiring and interfaces added to the Flight Control Electronics (FCE) of the aircraft, and further, avoids any drive system reliability issues associated with adding additional sensors. As discussed above, the existing solution involving redundant or multiple load paths adds both weight and cost to the aircraft and requires periodic inspections, typically at shorter time intervals than normal periodic maintenance inspections.

The system 100 thus enables the production of aircraft that are safer, lighter in weight and that have longer aircraft inspection intervals, resulting in lower maintenance costs and higher reliability by eliminating the need to install and maintain a different set of more accurate sensors specific to the freewheeling skew detection system. The novel system 100 detects and annunciates a flap failure within two flight operations of the detection system (i.e., two takeoffs and landings of the host aircraft). The conventional multiple load path solution does not detect a failure at the time of occurrence, and moreover, adds weight and recurring costs to the aircraft. Also, as discussed above, visual detection of a flap drooping due to a structural failure is possible only with certain TE flap configurations, whereas, the present system 100 can be used successfully with any TE flap configuration.

By now, those of skill in this art will appreciate that many modifications, substitutions and variations can be made in and to the materials, apparatus, configurations and methods of the freewheeling skew detection system of the present disclosure without departing from its spirit and scope. Accordingly, the scope of the present disclosure should not be limited to the particular embodiments illustrated and described herein, as they are merely by way of some examples thereof, but rather, should be fully commensurate with that of the claims appended hereafter and their functional equivalents.

What is claimed is:

1. A method for detecting wing flap freewheeling skew failures in an aircraft having trailing edge (TE) flaps and associated flap drive mechanisms located symmetrically with respect to a sagittal plane of the aircraft, the method comprising:

measuring the outputs of flap skew sensors of each flap drive mechanism of each flap of the aircraft when the aircraft is in flight (IF) and the flaps are extended to a selected position;

computing the respective differences between the IF outputs of symmetrical pairs of the flap skew sensors;

measuring the outputs of the flap skew sensors of each flap drive mechanism of each flap of the aircraft when the aircraft is next disposed on the ground (OG) and the flaps are extended to the selected position;

computing the respective differences between the OG outputs of the symmetrical pairs of flap skew sensors;

computing the respective differences between the computed IF output difference and the computed OG output difference of each symmetrical pair of the sensors; and, comparing the computed IF and OG difference of each symmetrical pair of the sensors with each of a predetermined maximum threshold value (MaxTV) and a predetermined minimum threshold value (MinTV) to determine whether a freewheeling skew failure exists in any of the flaps of the aircraft.

2. The method of claim 1, wherein the comparing of the computed IF and OG difference of each symmetrical pair of the sensors with each of the MaxTV and the MinTV further comprises producing a digital output indicative of whether or not the computed IF and OG difference of each symmetrical pair of the sensors exceeds the MaxTV or the MinTV.

3. The method of claim 1, further comprising:
identifying a drive mechanism of a flap in which a freewheeling skew failure exists; and,
announcing the identity of the drive mechanism and the existence of the freewheeling skew failure therein.

4. The method of claim 1, wherein a freewheeling skew failure is deemed to exist if the computed IF and OG difference of any symmetrical pair of the sensors exceeds the predetermined maximum threshold value (MaxTV).

5. The method of claim 1, wherein a freewheeling skew failure is deemed to exist if the computed IF and OG difference of any symmetrical pair of the sensors and the computed IF and OG difference of the same pair of sensors computed during an immediately preceding flight operation of the aircraft both exceed the predetermined minimum threshold value (MinTV).

6. The method of claim 1, wherein the selected extended position of the flaps corresponds to a position at which aerodynamic forces acting on the flaps during flight of the aircraft are at a maximum.

7. The method of claim 6, wherein the selected extended position of the flaps corresponds to a detent 20 position of the flaps.

8. The method of claim 1, further comprising:
filtering noise from the respective differences between the IF outputs and the OG outputs of the symmetrical pairs of the flap skew sensors; and,
storing the filtered differences in a memory.

9. The method of claim 1, wherein the measuring of the IF outputs of the flap skew sensors is performed when the sensor outputs are in a substantially steady state.

10. The method of claim 1, wherein the measuring of the OG outputs of the flap skew sensors is performed when the sensor outputs are in a substantially steady state.

11. The method of claim 3, further comprising inspecting the flap drive mechanisms in which freewheeling skew failures have been detected before permitting a next flight of the aircraft.

12. An apparatus for detecting freewheeling skew failures in an aircraft having trailing edge (TE) flaps and associated flap drive mechanisms located symmetrically with respect to a sagittal plane of the aircraft, the apparatus comprising:
an instrument for measuring:
the outputs of flap skew sensors of each flap drive mechanism of each flap of the aircraft when the aircraft is in flight (IF) and the flaps are extended to a selected position; and,
the outputs of the flap skew sensors of each flap drive mechanism of each flap of the aircraft when the aircraft is next disposed on the ground (OG) and the flaps are extended to the selected position;
a computer for computing:
the respective differences between the IF outputs of symmetrical pairs of the flap skew sensors;
the respective differences between the OG outputs of the symmetrical pairs of flap skew sensors;
the respective differences between the computed IF output difference and the computed OG output difference of each symmetrical pair of the sensors;
a memory for storing predetermined maximum and minimum threshold values (MaxTV) and (MinTV); and,
a comparator for comparing the computed IF and OG difference of each symmetrical pair of the sensors with the predetermined maximum and minimum threshold values MaxTV and MinTV to determine whether a freewheeling skew failure exists in any of the flaps of the aircraft.

13. The apparatus of claim 12, further comprising logic circuitry configured to produce a digital output indicative of whether or not the computed IF and OG difference of each symmetrical pair of the sensors exceeds the MaxTV or the MinTV.

14. The apparatus of claim 12, further comprising an annunciator for announcing the determination of the existence of a freewheeling skew failure in a drive mechanism of a flap and the identity of the drive mechanism in which the failure exists.

15. The apparatus of claim 13, wherein the logic circuitry is configured to produce a logical one when the computed IF and OG difference of any symmetrical pair of the sensors exceeds the predetermined maximum threshold value (MaxTV).

16. The apparatus of claim 13, wherein the logic circuitry is configured to produce a logical one if the current computed IF and OG difference of any symmetrical pair of the sensors and the computed IF and OG difference of the same pair of sensors computed during an immediately preceding flight operation of the aircraft both exceed the predetermined minimum threshold value (MinTV).

17. The apparatus of claim 16, further comprising a memory for storing the computed IF and OG difference of each of the symmetrical pairs of sensors computed during an immediately preceding flight of the aircraft.

18. The apparatus of claim 12, wherein the sensors comprise Rotary Variable Differential Transformer (RVDT) sensors.

19. The apparatus of claim 12, further comprising:
a filter for filtering noise from the respective differences between the IF and the OG outputs of the symmetrical pairs of the flap skew sensors; and,
a memory for storing the filtered differences.

20. The apparatus of claim 12, further comprising an apparatus for determining when the sensor outputs are at a substantially steady state.

* * * * *